(12) United States Patent
White et al.

(10) Patent No.: US 10,268,735 B1
(45) Date of Patent: Apr. 23, 2019

(54) GRAPH BASED RESOLUTION OF MATCHING ITEMS IN DATA SOURCES

(71) Applicant: Palantir Technologies Inc., Palo Alto, CA (US)

(72) Inventors: Nicholas White, Palo Alto, CA (US); Han Xu, Palo Alto, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 220 days.

(21) Appl. No.: 15/391,532

(22) Filed: Dec. 27, 2016

Related U.S. Application Data

(60) Provisional application No. 62/272,574, filed on Dec. 29, 2015.

(51) Int. Cl.
*G06F 17/30* (2006.01)

(52) U.S. Cl.
CPC .... *G06F 17/3053* (2013.01); *G06F 17/30598* (2013.01); *G06F 17/30958* (2013.01)

(58) Field of Classification Search
USPC .......................................................... 707/749
See application file for complete search history.

(56) References Cited

U.S. PATENT DOCUMENTS

| | | | |
|---|---|---|---|
| 5,632,009 | A | 5/1997 | Rao et al. |
| 6,167,405 | A | 12/2000 | Rosensteel, Jr. et al. |
| 6,456,997 | B1 | 9/2002 | Shukla |
| 6,594,672 | B1 | 7/2003 | Lampson et al. |
| 6,980,984 | B1 | 12/2005 | Huffman et al. |
| 7,451,397 | B2 | 11/2008 | Weber et al. |
| 7,941,321 | B2 | 5/2011 | Greenstein et al. |
| 7,971,150 | B2 | 6/2011 | Raskutti et al. |
| 8,196,184 | B2 | 6/2012 | Amirov et al. |
| 8,290,926 | B2 | 10/2012 | Ozzie et al. |

(Continued)

FOREIGN PATENT DOCUMENTS

| | | |
|---|---|---|
| AU | 2014250678 | 2/2016 |
| EP | 1672527 | 6/2006 |

(Continued)

OTHER PUBLICATIONS

About 80 Minutes, "Palantir in a Number of Parts—Part 6—Graph," Mar. 21, 2013, pp. 1-6, retrieved from the internet http://about80minutes.blogspot.nl/2013/03/palantir-in-number-of-parts-part-6-.

(Continued)

*Primary Examiner* — Hung T Vy
(74) *Attorney, Agent, or Firm* — Hickman Palermo Becker Bingham LLP; Christopher J. Palermo

(57) ABSTRACT

In an embodiment, a computer-implemented method comprises calculating a first relational classification score for a first node in a first graph; calculating a second relational classification core for a second node in a second graph; calculating a relational classification matching score for the first node and the second node that is based upon on the first relational classification score and the second relational classification score; calculating a composite score based at least upon the relational classification matching score; generating a canonical tuple that represents a match between the first node and the second node in response to determining that the composite score is equal to or greater than a specified threshold score value.

20 Claims, 7 Drawing Sheets

(56) References Cited

U.S. PATENT DOCUMENTS

| | | | |
|---|---|---|---|
| 8,489,623 B2 | 7/2013 | Jain et al. |
| 8,554,709 B2 | 10/2013 | Goodson et al. |
| 8,595,234 B2 | 11/2013 | Siripuapu et al. |
| 8,639,757 B1 | 1/2014 | Zang et al. |
| 8,676,857 B1 | 3/2014 | Adams et al. |
| 8,787,939 B2 | 7/2014 | Papakipos et al. |
| 8,812,960 B1 | 8/2014 | Sun et al. |
| 9,069,842 B2 | 6/2015 | Melby |
| 9,116,975 B2 | 8/2015 | Shankar et al. |
| 9,146,954 B1 | 9/2015 | Boe et al. |
| 9,229,952 B1 | 1/2016 | Meacham et al. |
| 2002/0095658 A1 | 7/2002 | Shulman |
| 2003/0036848 A1 | 2/2003 | Sheha et al. |
| 2003/0172014 A1 | 9/2003 | Quackenbush et al. |
| 2003/0229848 A1 | 12/2003 | Arend et al. |
| 2004/0032432 A1 | 2/2004 | Baynger |
| 2004/0111410 A1 | 6/2004 | Burgoon et al. |
| 2004/0163039 A1 | 8/2004 | Gorman |
| 2004/0193600 A1 | 9/2004 | Kaasten et al. |
| 2004/0205524 A1 | 10/2004 | Richter et al. |
| 2005/0065811 A1 | 3/2005 | Chu et al. |
| 2005/0078858 A1 | 4/2005 | Yao et al. |
| 2005/0154628 A1 | 7/2005 | Eckart et al. |
| 2005/0154769 A1 | 7/2005 | Eckart et al. |
| 2006/0074881 A1 | 4/2006 | Vembu et al. |
| 2006/0184889 A1 | 8/2006 | Molander |
| 2006/0209085 A1 | 9/2006 | Wong et al. |
| 2006/0242040 A1 | 10/2006 | Rader |
| 2007/0150369 A1 | 6/2007 | Zivin |
| 2007/0192265 A1 | 8/2007 | Chopin et al. |
| 2007/0208736 A1 | 9/2007 | Tanigawa et al. |
| 2008/0040275 A1 | 2/2008 | Paulsen et al. |
| 2008/0162616 A1 | 7/2008 | Gross et al. |
| 2008/0249983 A1 | 10/2008 | Meisels et al. |
| 2009/0055251 A1 | 2/2009 | Shah et al. |
| 2009/0150854 A1 | 6/2009 | Elaasar et al. |
| 2009/0192957 A1 | 7/2009 | Subramanian et al. |
| 2009/0327208 A1 | 12/2009 | Bittner et al. |
| 2010/0030722 A1 | 2/2010 | Goodson et al. |
| 2010/0114887 A1 | 5/2010 | Conway et al. |
| 2010/0228812 A1 | 9/2010 | Uomini |
| 2010/0306029 A1 | 12/2010 | Jolley |
| 2010/0325526 A1 | 12/2010 | Ellis et al. |
| 2011/0004498 A1 | 1/2011 | Readshaw |
| 2011/0029526 A1 | 2/2011 | Knight et al. |
| 2011/0078055 A1 | 3/2011 | Faribault et al. |
| 2011/0131547 A1 | 6/2011 | Elaasar |
| 2011/0161137 A1 | 6/2011 | Ubalde et al. |
| 2011/0173032 A1 | 7/2011 | Payne et al. |
| 2011/0181598 A1 | 7/2011 | O'Neall et al. |
| 2011/0219321 A1 | 9/2011 | Gonzalez et al. |
| 2011/0258158 A1 | 10/2011 | Resende et al. |
| 2011/0289407 A1 | 11/2011 | Naik et al. |
| 2011/0289420 A1 | 11/2011 | Morioka et al. |
| 2012/0004904 A1 | 1/2012 | Shin et al. |
| 2012/0036013 A1 | 2/2012 | Neuhaus et al. |
| 2012/0075324 A1 | 3/2012 | Cardno et al. |
| 2012/0116828 A1 | 5/2012 | Shannon |
| 2012/0117082 A1 | 5/2012 | Koperda et al. |
| 2012/0170847 A1 | 7/2012 | Tsukidate |
| 2012/0197651 A1 | 8/2012 | Robinson et al. |
| 2012/0203708 A1 | 8/2012 | Psota et al. |
| 2012/0221553 A1 | 8/2012 | Wittmer et al. |
| 2012/0245976 A1 | 9/2012 | Kumar et al. |
| 2012/0296907 A1 | 11/2012 | Long et al. |
| 2013/0006916 A1 | 1/2013 | McBride et al. |
| 2013/0046635 A1 | 2/2013 | Grigg et al. |
| 2013/0050217 A1 | 2/2013 | Armitage |
| 2013/0073454 A1 | 3/2013 | Busch |
| 2013/0110641 A1* | 5/2013 | Ormont .............. G06Q 30/0251 705/14.66 |
| 2013/0110822 A1 | 5/2013 | Ikeda et al. |
| 2013/0117011 A1 | 5/2013 | Ahmed et al. |
| 2013/0151148 A1 | 6/2013 | Parundekar et al. |
| 2013/0157234 A1 | 6/2013 | Gulli et al. |
| 2013/0267207 A1 | 10/2013 | Hao et al. |
| 2013/0311375 A1 | 11/2013 | Priebatsch |
| 2014/0067611 A1 | 3/2014 | Adachi et al. |
| 2014/0095273 A1 | 4/2014 | Tang et al. |
| 2014/0108068 A1 | 4/2014 | Williams |
| 2014/0129261 A1 | 5/2014 | Bothwell et al. |
| 2014/0156527 A1 | 6/2014 | Grigg et al. |
| 2014/0258246 A1 | 9/2014 | Lo Faro et al. |
| 2014/0310266 A1 | 10/2014 | Greenfield |
| 2014/0316911 A1 | 10/2014 | Gross |
| 2014/0351070 A1 | 11/2014 | Christner et al. |
| 2015/0019394 A1 | 1/2015 | Unser et al. |
| 2015/0073929 A1 | 3/2015 | Psota et al. |
| 2015/0134666 A1 | 5/2015 | Gattiker et al. |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0324868 A1 | 11/2015 | Kaftan et al. |
| 2015/0347591 A1* | 12/2015 | Bax .................... G06Q 30/0269 707/749 |
| 2015/0347903 A1 | 12/2015 | Saxena et al. |
| 2015/0378996 A1 | 12/2015 | Kesin et al. |
| 2016/0004667 A1 | 1/2016 | Chakerian et al. |
| 2016/0034545 A1 | 2/2016 | Shankar et al. |
| 2016/0098173 A1 | 4/2016 | Slawinski et al. |

FOREIGN PATENT DOCUMENTS

| | | |
|---|---|---|
| EP | 2863326 | 4/2015 |
| EP | 2884439 | 6/2015 |
| EP | 2884440 | 6/2015 |
| WO | WO 2002/065353 | 8/2002 |
| WO | WO 2010/098958 | 9/2010 |

OTHER PUBLICATIONS

Bluttman et al., "Excel Formulas and Functions for Dummies," 2005, Wiley Publishing, Inc., pp. 280, 284-286.

Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.

Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.

Jelen, Bill, "Excel 2013 in Depth, Video Enhanced Edition," Jan. 25, 2013.

Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.

Keylines.com, "KeyLines Datasheet," Mar. 2014, <http://keylines.com/wp-content/uploads/2014/03/KeyLines-datasheet.pdf> downloaded May 12, 2014 in 2 pages.

Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10.

Palantir Technologies, "Palantir Labs—Timeline," Oct. 1, 2010, retrieved from the internet https://www.youtube.com/watch?v=JCgDW5bru9M retrieved on Aug. 19, 2015.

Palmas et al., "An Edge-Bunding Layout for Interactive Parallel Coordinates" 2014 IEEE Pacific Visualization Symposium, pp. 57-64.

Psaltis, Andrew G., "Streaming Data—Designing the Real-Time Pipeline," Jan. 16, 2015, vol. MEAP VO3, pp. 0-12.

Vose et al., "Help File for ModelRisk Version 5," 2007, Vose Software, pp. 349-353. [Uploaded in 2 Parts].

Wikipedia, "Federated Database System," Sep. 7, 2013, retrieved from the internet on Jan. 27, 2015 http://en.wikipedia.org/w/index.php?title=Federated_database_system&oldid=571954221.

Wikipedia, "Mobile Web," Jan. 23, 2015, retrieved from the internet on Mar. 15, 2016 https://en.wikipedia.org/w/index.php?title=Mobile_Web&oldid=643800164.

(56) References Cited

OTHER PUBLICATIONS

Windley, Phillip J., "The Live Web: Building Event-Based Connections in the Cloud," Dec. 21, 2011, pp. 10, 216.

Wright et al., "Palantir Technologies VAST 2010 Challenge Text Records—Investigations into Arms Dealing," Oct. 29, 2010, pp. 1-10, retrieved from the internet http://hcil2.cs.umd.edu/newvarepository/VAST%20Challenge%202010/challenges/MC1%20-%20Investigations%20into%20Arms%20Dealing/entries/Palantir%20Technologies/ retrieved on Aug. 20, 2015.

Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.

Janssen, Jan-Keno, "Wo bist'n. du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-088.pdf.

\* cited by examiner

GRAPH BASED RESOLUTION OF MATCHING ITEMS IN DATA SOURCES

BENEFIT CLAIM

This application claims the benefit under 35 U.S.C. § 119(e) of provisional application 62/272,574, filed Dec. 29, 2015, the entire contents of which are hereby incorporated by reference for all purposes as if fully set forth herein.

TECHNICAL FIELD

The disclosed embodiments are in the technical fields of databases, digital data entity resolution, digital data representations such as graphs, and computer memory management, as well as improvements in algorithms for comparing nodes of graphs and other digital data representations and determining whether nodes or entities match or represent the same real-world item.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Databases are used to store representations of real-life objects. These representations often incorporate names and descriptions and attempt to accurately—but in simplified form—capture the characteristics and essences of their real-life counterparts. Many databases go one step further and incorporate a scheme with which to capture relationships between the representations that they contain.

In many fields, it becomes necessary to access data stretched across multiple databases that overlap substantially. These fields include the medical practice and research, historical research, general master data management fields, and many other more that require organizing large quantities of data over multiple structures and databases.

Unfortunately, representations of the same real-life object in two different databases are often not the same. When these databases are compared or when they are to be used together, it is difficult to immediately discern if two representations do in fact refer to the same real-life object. While simply checking the names of each representation will suffice in some circumstances, the problem grows increasingly difficult when each database chooses to use a different naming convention for its own representations, such as using for acronyms or synonyms rather than a formal full name.

As a result, other means are employed—for example, a comparison against a previously, and often manually, generated table of alternate names or a comparison of the properties of each representation. However even a comparison of the properties themselves face similar problem—for example, where one property may be termed "state," another may use the term "province," and yet another "territory." To address this, yet another table of alternative names will have to be created to improve accuracy. Ultimately the process is no more convenient than having an end-user simply compare representations and identify matches manually. Thus, there is a need for improved computer functionality that can identify data elements or data representations that match; in this context, a match of two items means that the items map to the same object.

DETAILED DESCRIPTION OF THE EXAMPLE EMBODIMENTS

Figure 1:
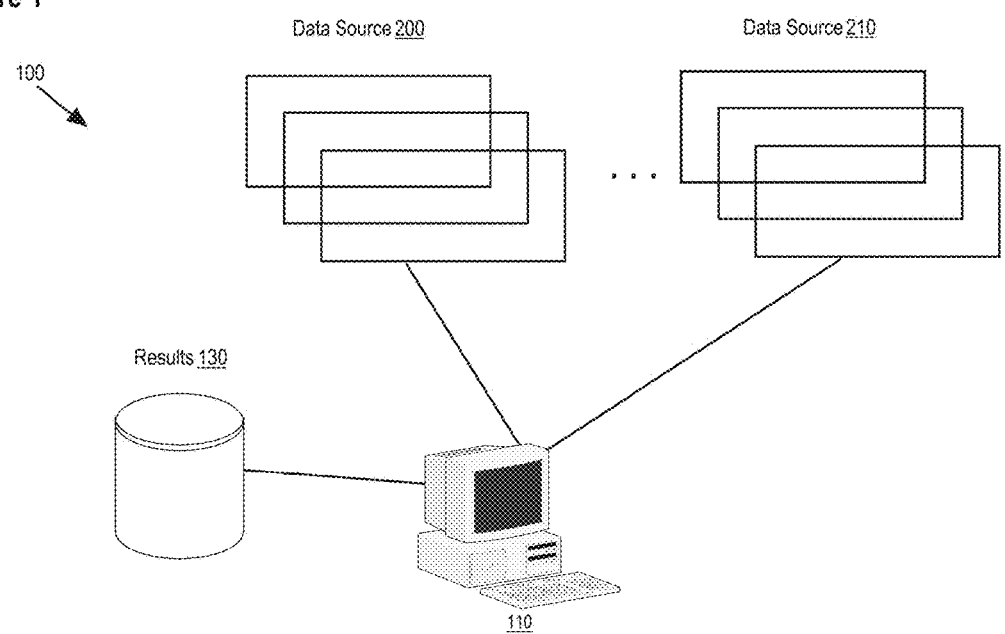
FIG. 1 illustrates an example system for identifying matches between elements in distinct data sources according to some embodiments.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Embodiments are described according to the following outline:

1. GENERAL OVERVIEW
2. STRUCTURAL OVERVIEW—EXAMPLE COMPUTER SYSTEM
3. FUNCTIONAL OVERVIEW—EXAMPLE PROCESSING ALGORITHMS
4. IMPLEMENTATION EXAMPLE—HARDWARE OVERVIEW
5. EXTENSIONS AND ALTERNATIVES

1. GENERAL OVERVIEW

In an embodiment, a computer-implemented method comprises calculating a first relational classification score for a first node in a first graph; calculating a second relational classification core for a second node in a second graph; calculating a relational classification matching score for the first node and the second node that is based upon on the first relational classification score and the second relational classification score; calculating a composite score based at least upon the relational classification matching score; generating a canonical tuple that represents a match between the first node and the second node in response to determining that the composite score is equal to or greater than a specified threshold score value. Various features, refinements, sub concepts, aspects and variations are further described in other sections and paragraphs herein, in some cases with reference to the drawing figures.

In another embodiment, a computer-implemented data processing method for determining whether a first node, which is associated with a first entity of a first data source, matches and represents a same object as a second node, which is associated with a second entity of a second, different data source, comprises calculating a first relational classification score for the first node in a first graph that has been created and stored in a computer memory based upon the first entity of the first data source and calculating a second relational classification core for the second node in a second graph that has been created and stored in the computer memory based upon the second entity of the second data source, including calculating each relational classification score as a measure of a logical position of the first node, and based upon relationships to other nodes by calculating a distance of the first node to a root node of the first graph, counting proximate nodes to which the first node is joined as parent nodes, grandparent nodes, child nodes, or grandchild nodes, and determining which proximate nodes match the first node in node identifiers, properties or attributes; calculating a relational classification matching score for the first node and the second node that is based upon on the first relational classification score and the second relational classification score, as a representation of similarity between the first node and the second node based upon a first similarity of the respective locations of the nodes, a second similarity of all proximate nodes that are joined respectively to the first node and the second node, and a third similarity of numbers of child nodes of the first node and the second node; calculating a composite score as a measure of quality of match of the first node and the second node, using the relational classification matching score and also using one or more of: a node identifier edit distance matching score, property matching score, known synonym matching score, or known abbreviation matching score; generating a canonical tuple that represents a match between the first node and the second node in response to determining that the composite score is equal to or greater than a specified threshold score value.

In one feature, the method further comprises creating and storing, in computer memory, an output graph comprising the first graph, the second graph, and the canonical tuple, wherein the canonical tuple comprises a first edge and a second edge that respectively link the canonical tuple to the first node and the second node when the composite score exceeds a threshold value; partitioning the output graph into two or more clusters of nodes, in which all nodes of a particular cluster among the two or more clusters are directly or transitively connected by edges of the output graph; causing displaying the output graph using a computer display device in a graphical user interface that visually depicts one or more nodes, edges, and canonical tuples of the output graph.

Computer-implemented techniques are described herein for identifying matches between nodes in distinct undirected cyclic graphs by combining them into a single undirected acyclic graph. Thus, a first graph and a second graph, in an embodiment, are graphical representations of a first data source and a second data source, respectively, wherein elements of the first data source and the second data source are organized in a relational structure reproduced in the first graph and the second graph as a set of parents and children relationships between nodes. In an embodiment, the first data source and the second data source contain analogous elements, for example, geographical locations with a root node of "Earth," or internal organizational structures for merging corporations. The combined undirected acyclic graph, which may be termed an output graph, contains all the nodes from the first and second graphs, but the links on this output graph indicate the connected nodes refer to the same underlying object; that is, the connected nodes are different representations of the same underlying entity.

In an embodiment, a relational classification score is a measure of a logical position or location of a node, within a graph that has been derived or generated based upon database records of a database that contains the node, and based upon relationships to other nodes. Informally, the relational classification score represents where a node sits or is positioned in a graph representation of a database in which the node was found. The relational classification score incorporates the positioning of the node in the graph by calculating a distance to a root node of the graph that contains the node, as well as counting the nodes in its immediate vicinity or to which the node has a relationship, such as parent nodes, grandparent nodes, child nodes, or grandchild nodes, as well as whether or not those proximate nodes match the subject node in terms of identifiers, properties or attributes. Proximate nodes may be descendants or ancestors at any level. Distance calculations may use distance algorithms known in the literature, such as Levenshtein distance based on entity names.

A "graph," in the context of this disclosure, comprises digital data stored in memory or in persistent storage that represents two or more nodes joined by one or more edges, and that may be visually rendered, or inspected, transformed, altered or managed, using graph operations. Graph here is used in the sense of digital data representation in computer memory or storage, rather than in the sense of a chart that uses two axes, but the stored graphs described herein can be visually rendered in a graphical user interface of a computer with depictions similar to those of FIG. 2, FIG. 6. Generating, storing, and performing transformation operations on graphs, based upon records, rows or other digitally stored structures of databases, is orthogonal to this disclosure and those of skill in the art are presumed to be familiar with graphs, graph theory, graph formation based on records in databases, and graph transformation and manipulation operations. Each graph may be directed, non-directed, acyclical, or cyclical. Generating a graph also may include correcting internal inconsistencies in data such as circular node references. Each graph described herein serves, in one sense, as a proxy representation of data that is stored or represented in data sources, and facilitates determining whether different entities in different data sources actually represent the same physical or logical object using the graph-based algorithms that are described herein; however, in other embodiments, the processes described herein can be adapted to data representations other than graphs, for data that is stored in the underlying data sources.

In an embodiment, a relational classification matching score is a comparison of the relational classification score of at least two nodes and represents the similarity between two nodes. In an embodiment, the relational classification matching score incorporates a similarity of the respective locations of the nodes; for example, similarity in the distance from the nodes to their respective root nodes, or similarity in the distance from the nodes to a leaf node, is considered. In an embodiment, the relational classification matching score also accounts for the similarity of each close relative node of a subject node, for example, whether each node has matching relative nodes, and if each node has a similar number of child nodes at any level of depth.

In an embodiment, a composite score is computed as a measure of the overall quality of the match between nodes. The composite score is based on one or more relational classification matching scores. The composite score includes the relational classification matching score, but can also include other matching scores, including but not limited to, node identifier edit distance matching score, property matching score, known synonym matching score, known abbreviation matching score, containment such as whether one set of nodes is a superset of another, and input from external analysis. The composite score is the ultimate measure of how closely the two nodes match or map to the same object. "Edit distance," in this context, refers to how many nodes would have to be added or removed from one set or another to obtain an exact match; edit distance also can be determined for entity identifiers.

In one embodiment, where a composite score exceeds a threshold value, the two nodes are linked in an output graph, for example, using a canonical tuple, which may be represented as a new node joined by edges to the two input graphs. The output graph may comprise an undirected cyclic graph that is stored in digital memory and consists of both a first graph, a second graph, and one or more canonical tuples that link matching nodes of the first graph and the second graph. The output graph then is partitioned into clusters of nodes, in which all nodes of each cluster are directly or transitively connected by the edges of the output graph. Consequently, each cluster is a connected subgraph of the set of all nodes. A cluster may consist of a single node and no links; such a cluster represents a node that appears in one source system, but no others.

Further, in an embodiment, after the output graph is generated, the output graph may be displayed in a graphical user interface that visually depicts some or all of the nodes, edges, and canonical tuples of the output graph. In some embodiments, data representing the output graph is sent to another computer system that is responsible for rendering or displaying the output graph; examples include a presentation layer in another application program, a web browser, an application program executing in a mobile computing device that has an integrated presentation or display capability, and the like.

In an embodiment, a cluster of nodes in the output graph is used as a single entity, or effectively as a single node, in calculating the relational classification score and in calculating the relational classification matching score. This approach permits the computer to test whether new information, namely that the nodes in the cluster represent the same real-world entity, helps clarify the underlying meaning of the other nodes.

In an embodiment, subsequent analysis may be performed on the clusters in the output graph, rather than on the original set of nodes.

The data sources may provide additional information of the nodes they contain. For example, a data source containing a node with the identifier "Houston" may provide a property "state" with the value "Texas". In an embodiment, nodes that are grouped into a cluster on the output graph may have different values for the same property. For example, one node may have "Texas" as the values of "state" property, whereas another might have "TX".

In an embodiment, for each cluster on the output graph, the computer is programmed select a single value from each property deterministically from the set of values for that property on the nodes contained within that cluster. For example, if a cluster had two nodes providing a value of the "state" property, the system would choose one of those values to be the "state" property of the entire cluster. In an embodiment, program instructions for choosing the property value for a cluster in from a set of values use an algorithm that is based on, for example:

the data source which the property value originally came from, as some systems could be known to be more accurate than others; or an analysis of the quality of the values, for example "Texas" could be a higher quality value for the "state" property than "TX" as it has more letters.

In an embodiment, the computer also is programmed to generate a cluster identifier for each cluster on the output graph, which provides the improvement that a cluster acting as a representation of the real-world entity is easier to reference unambiguously in subsequent external analysis. In an embodiment, cluster identifiers are treated as stable. In one approach, after minor changes to the output graph, such as adding or removing a single link, the score algorithms are re-processed, the output graph is repartitioned, and the cluster identifiers are regenerated, such that as many of the clusters have the same identifier as possible, but no two clusters have the same cluster identifier. By processing cluster identifiers in a stable manner such as this, the technique herein facilitates analyzing the impact of modifications to the algorithms to calculate the relational classification score and relational classification matching score; the stable cluster identifiers improve the ease of comparing the clusters that were produced before and after the changes.

In an embodiment, a cluster identifier could be the lexicographically highest node identifier of all the nodes contained in the cluster. For example, if a cluster contained two nodes with node identifiers "USA" and "United States," then the node identifier "United States" may be chosen as the cluster identifier.

Using these techniques, embodiments provide a distinct improvement in computer functionality by providing algorithms and methods for determining far more accurately and efficiently whether two nodes in two graphs, which have been derived from two different data sources, actually represent the same entity or real-world object. Certain embodiments specifically provide more efficient, accurate, improvement in computer function by more accurately determining whether a first node, which is associated with a first entity of a first data source, matches and represents a same object as a second node, which is associated with a second entity of a second, different data source. The operations and results of the algorithms disclosed herein have not been possible before because prior approaches have not considered the relationships, values, and scores that are described herein, in the same way and in the same combination to reach the same result. In particular, embodiments can provide accurate results even when two different data sources or databases use completely different naming conventions for the same physical or logical object that entities in the data sources, or nodes in graphs based on the data sources, are representing. Further, there is no need for supplemental tables in memory or in the databases to map or correlate different entities or nodes to one another, as a way to circumvent the use of different conventions. As a result, the present techniques can operate with less memory, less resource allocation, and simpler database schemas and memory structures.

Embodiments can be applied to any data storage system in which multiple data sources potentially store duplicate entities.

2. STRUCTURAL OVERVIEW—EXAMPLE COMPUTER SYSTEM

FIG. 1 illustrates an example computer system with which the techniques described may be practiced, according to some embodiments. The components of computer system 100 may be implemented at least partially by hardware at one or more computing devices, such as one or more hardware processors executing instructions stored in one or more memories for performing various functions described herein. System 100 illustrates only one of many possible arrangements of components configured to perform the functionality described herein. Other arrangements may include fewer or different components, and the division of work between the components may vary depending on the arrangement.

In an embodiment, system 100 includes a computer 110, one or more data sources 200, 210 coupled to the computer, and storage media for results 130. Each of the data sources 200, 210 and results 130 can be stored separately from the computer 110 or on the computer 110. Each of the data sources 200, 210 may comprise a database, flat file, object store, or other digitally stored data using a software system, a server computer, a client-server system having a client installed at computer 110, or other foundation technology. Typically data sources 200, 210 store nodes, records, tables or other data representations having data items that may or may not use consistent identifiers, schemas or ontologies. In an embodiment, computer 110 is programmed or configured using stored executable program instructions that implement the improved algorithmic techniques that are described in other sections herein, and are programmed to receive data from the data sources 200, 210, to process the data to generate clusters, identifiers, scores, comparisons and determinations of similarity as described herein, and to store the results either in the form of canonical tuples or resolved graphs in results 130. In some embodiments, results 130 may be implemented using a portion of main memory space of computer 110, or using a database or database server.

Data sources 200, 210 need not be structurally complex, and data obtained from them can be exported to a convenient form prior to generating graphs that are processed using the techniques herein. For example, sets of nodes could be exported to spreadsheet format, or files containing comma-separated values (CSVs) that specify node identifiers, parent nodes, types, and similar values.

3. FUNCTIONAL OVERVIEW—EXAMPLE PROCESSING ALGORITHMS

Figure 2:
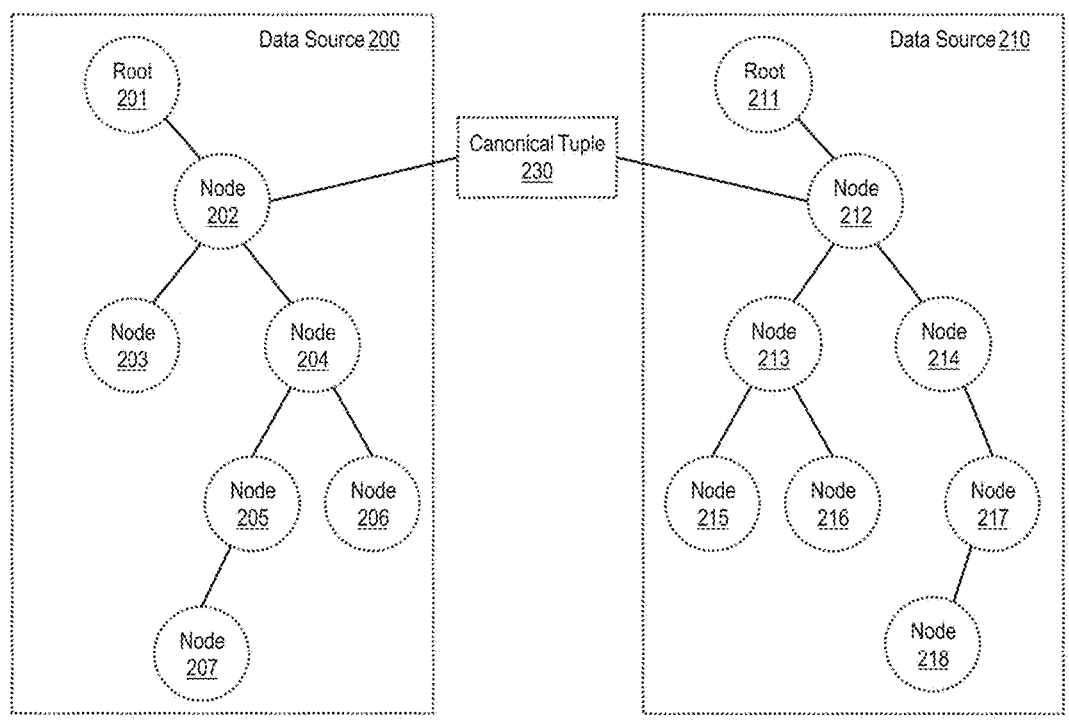
FIG. 2 illustrates an example state in which two data sources are being compared node-by-node for canonical matches.

FIG. 2 illustrates an example state in which two data sources are compared, under control of programmed instructions using the techniques herein, node-by-node for canonical matches. Data sources 200, 210 each respectively comprises a root node 201, 211, and child nodes 202, 203, 204, 205, 206, 207 (for data source 200) and 212, 213, 214, 215, 216, 217, 218 (for data source 210). Additionally, a canonical tuple 230 indicates a previous match between node 202 of data source 200 and node 212 of data source 210, as represented in FIG. 2 by lines linking the tuple 230 to nodes 202, 212.

While two data sources 200, 210 are pictured in FIG. 2 for purposes of illustrating a clear example, more than two data sources 200, 210 may be compared for canonical matches. Further, nodes 202-207 and 212-218 are pictured for purposes of illustrating a clear example, but more or fewer nodes than nodes 202-207 and 212-218 can be contained in data sources 200, 210 and arranged in a manner different from that pictured in FIG. 2. Similarly, while only one canonical tuple 230 is pictured, more or less than one canonical tuple 230 may have been generated indicating previous matches between nodes of two or more data sources 200, 210.

Additionally, in an embodiment, prior to comparing nodes in the two or more data sources 200, 210, the two or more data sources 200, 210 are corrected for any inconsistencies. Inconsistencies can include, but are not limited to, duplicate nodes, near duplicate nodes, relationship cycles, or floating nodes. Near duplicate nodes, in this context, refers to nodes within the same data source that represent the same real life object, but are represented in the data source using distinct representations. For example, if one data source has a first city value of "Houston", a second city value of "Houston, TX" and a third city value of "Huston, TX," these inconsistencies can be corrected either automatically by the computer 110 under program control.

In an embodiment, components depicted in FIG. 1 are programmed to identify canonical matches between data sources 200, 210. The example data sources 200, 210 contain nodes to be evaluated for canonical matches. In the instance where node 204 is compared to node 213 as a potential canonical match, node 204 has a parent node of 202 and node 213 has a parent node of 212. Node 204 has child nodes 205, 206, and node 213 has child nodes 215, 216.

Figure 3:
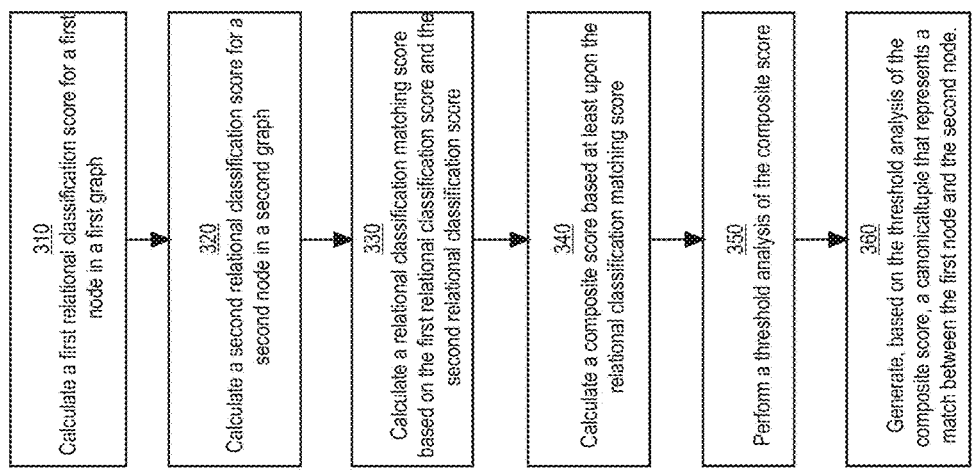
FIG. 3 illustrates an example flow diagram for identifying matches between nodes in distinct graphs using a graphical representation and orientation of the nodes.

FIG. 3 illustrates an example flow or algorithm that may be programmed for identifying matches between nodes in distinct graphs using a graphical representation and orientation of the nodes, according to some embodiments. In an embodiment, each of the processes described herein in connection with the functional blocks of FIG. 3 may be implemented using one or more computer programs, other software elements, and/or digital logic in any of a general-purpose computer or a special-purpose computer, while performing data retrieval, transformation, and storage operations that involve interacting with and transforming the physical state of memory of the computer. For example, computer 110 (FIG. 1) may be programmed as shown in FIG. 3 and the other flow diagrams of the disclosure.

The flow of FIG. 3 is described below in conjunction with the objects and components of FIG. 1 and FIG. 2, according to an embodiment, for purposes of illustrating a clear example, but the broad concepts illustrated algorithmically in FIG. 3 may be implemented in other systems and contexts of which FIG. 1 and FIG. 2 are merely one example.

In general, the flow of FIG. 3 depicts example techniques for identifying matches between nodes in distinct graphs, using the graphical representation and orientation of nodes in those graphs. The process of the flow of FIG. 3 may be repeated for each set of nodes, to generate respective canonical tuples for each set.

In block 310, a first relational classification score is calculated for a first node in a first graph. For example, a first node 204 of the graph in data source 200 is received by the computer 110, which calculates a first relational classification score for the first node 204. In an embodiment, the first relational classification score is based on the nodes that are immediate relatives of the first node 204. The first relational classification score can take into consideration that node 204 has two child nodes 205, 206. The first relational classification score can also take into consideration that node 204 has one parent node 202.

In another example, the first relational classification score is based on the edit distance of a path from the root node 201 of the first graph of data source 200 and the first child node 204. The first relational classification score can take into consideration that the path from the root node 201 to the first child node 204 is {root node 201, node 202, node 204} and has a length of three (3).

In block 320, the process calculates a second relational classification score for a second node in a second graph. Typically block 320 is performed for a data source different from the data source used in block 310, to enable a later comparison of the resulting data. For example, the second node 213 from the second graph of data source 210 is received by the computer 110, which calculates a second relational classification score for the second node 213. As an example, the second relational classification score is based on the immediate relatives of the second node 213. The second relational classification score can take into consideration that node 213 has two child nodes 215, 216. The second relational classification score can also take into consideration that node 213 has one parent node 212.

As another example, the second relational classification score is based on the edit distance of a path from the root node 211 of the second graph of data source 210 and the second node 213. The second relational classification score can take into consideration that the path from the root node 211 to the second node 213 is {root node 211, node 212, node 213} and has a length of three (3).

In block 330, the process calculates a relational classification matching score based on the first relational classification score and the second relational classification score. For example, computer 110 is programmed to calculate a relational classification matching score based on the first relational classification score for the first node 204 and the second relational classification score for the second node 213. As an example, where the first relational classification score for the first node 204 and the second relational classification score for the second node 213 were based on their respective immediate relative nodes, the computer 110 is programmed or configured to calculate a relational classification matching score that indicates a higher probability of a match when the first node 204 has the same number of parent nodes 202, and child nodes 205, 206 as the second node 213, which has parent node 212 and child nodes 215, 216. Thus, the relational classification matching score may be a numeric measure of an amount of similarity between the number and arrangement of two sets of immediate relative nodes having edges respectively joined to two nodes in two different graphs or data sources that are the subject of comparison.

In the example of FIG. 2, the first node 204 and the second node 213 each have an immediate relative that match, as parent node 202 and parent node 212 have been identified as canonical matches by the canonical tuple 230. In an embodiment, computer 110 is programmed to calculate the relational classification matching score to indicate an even higher probability of a match, compared to a situation in which there were no matches among the immediate relative nodes. Thus, in an embodiment, no matches among immediate relative nodes produces a lower relational classification matching score than a match among immediate relative nodes, which would produce a lower relational classification matching score than a match between similarly oriented relative nodes. For example, a parent-parent match, like node 202 to node 212, or a child-child match as opposed to a parent-child match would produce a higher relational classification matching score.

Alternatively, if the first relational classification score for the first node 204 and the second relational classification score for the second node 213 is based on the edit distances of paths from their respective nodes root node 201, 211, then computer 110 is programmed to calculate a relational classification matching score that indicates a higher probability of a match when the path and the path length for the first node 204 is more similar to the path and the path length for the second node 213.

Additionally, in one embodiment, in the example of FIG. 2, the path from root node 201 to the first node 204 and the path from root node 211 to the second node 213 each contain an immediate relative that match, as nodes 202, 212 have been identified as canonical matches by the canonical tuple 230. Therefore, the computer 110 is programmed to calculate the relational classification matching score to indicate an even higher probability of a match as compared to an arrangement in which there were no matches among the nodes in the path from the root node 201 to the first node 204 and the root node 211 to the second node 213. In an embodiment, computer 110 is programmed such that a greater number of matches between nodes in a path from root node 201 to the first node 204 and from root node 211 to the second node 213 results in a relational classification matching score that indicates a higher probability of a match between node 204, 213 than if there were fewer matches.

In block 340, the process calculates a composite score based at least upon the relational classification matching score that was obtained at block 330. For example, computer 110 is programmed to calculate the composite score based at least upon the relational classification matching score. In one embodiment, the computer 110 is programmed to calculate the composite score based upon the relational classification matching score and additionally upon one or more of: an entity identifier edit distance score between node 204 and node 213; a property score between node 204 and node 213; a known synonym score between node 204 and node 213; or a known abbreviation score between node 204 and node 213. The factors identified in the preceding sentence are not exhaustive but merely provide an example, and other embodiments may use fewer factors, more factors, or different factors.

In one embodiment, computer 110 calculates the entity identifier edit distance score between node 204 and node 213 by strictly comparing the identifier of node 204 and the identifier of node 213.

In another embodiment, computer 110 calculates a property score for node 204 and node 213 by comparing both identifiers and values of properties of node 204 to identifiers and values of properties of node 213. A higher property score results when greater similarity of the respective identifiers and property values is present.

Computer 110 may be programmed to calculate a known synonym score for node 204 and node 213 by comparing the identifier of node 204 and the identifier of node 213 to a digitally stored table of synonyms. If the identifiers are in the table, then the known synonym score value is high.

In another embodiment, computer 110 calculates a known abbreviation score between node 204 and node 213 by comparing the identifier of node 204 and the identifier of node 213 to a digitally stored table of abbreviations. If the identifiers are in the table, then the known abbreviation score value is high.

In block 350, the process performs a threshold analysis of the composite score value that was determined at block 340. For example, computer 110 performs a threshold analysis of the composite score by comparing the composite score to a pre-determined threshold value. Computer 110 may be programmed to determine that the composite score indicates a match if the composite score is equal to or greater than the specified threshold value. In another embodiment, the threshold analysis of the composite score is performed by an end-user and the computer 110 receives feedback from the end-user indicating whether the composite score value is sufficient to indicate a canonical match between nodes.

In block 360, the process generates, based on the threshold analysis, a canonical tuple that represents a match between the first node and second node. For example, computer 110 generates, based on the threshold analysis of the composite score in block 350, a canonical tuple that represents a match between the first node 204 and the second node 213. The canonical tuple comprises data identifying the associated nodes and the composite score of node 204 and node 213. In another example, the computer 110 generates a canonical tuple indicating just that node 204 and node 213 were determined to be a match in block 350.

Figure 4:
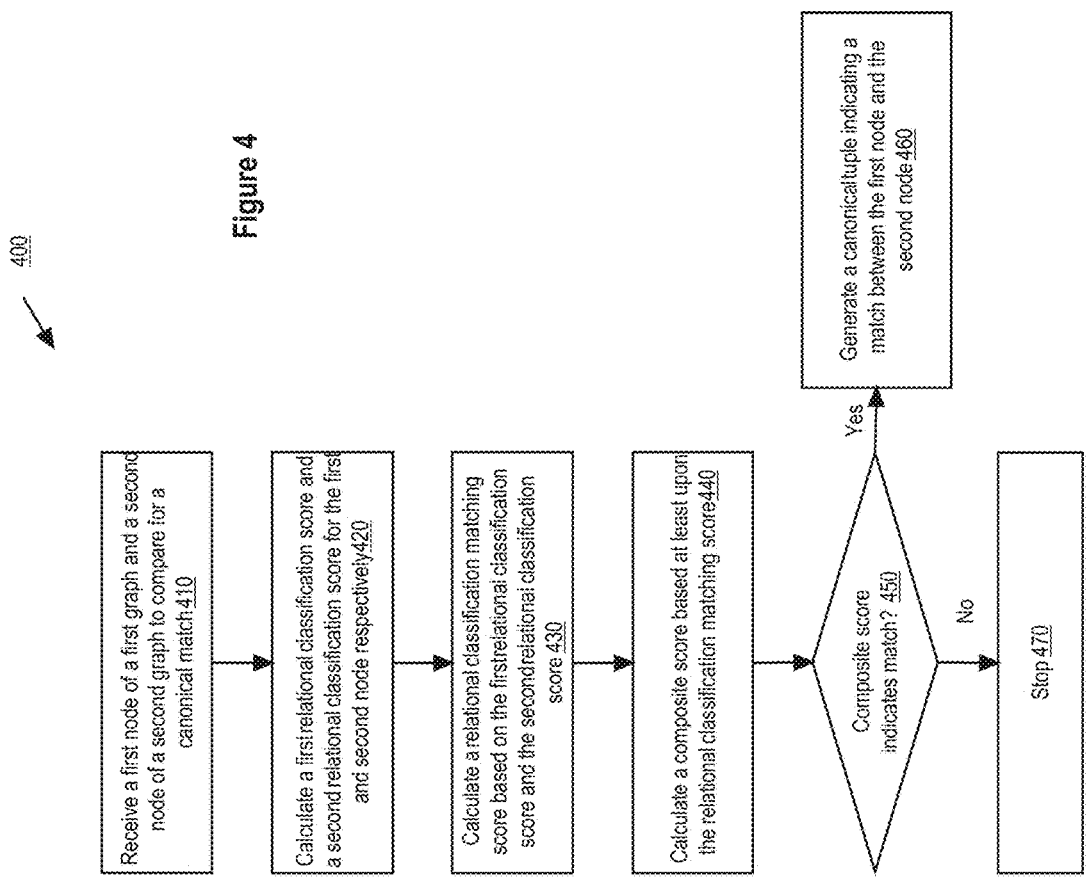
FIG. 4 illustrates an example flow diagram for creating canonical tuples indicating matches between a first node from a first graph and a second node from a second graph.

FIG. 4 illustrates an example flow or algorithm that may be programmed for identifying matches between nodes in distinct graphs using a graphical representation and orientation of the nodes, according to some embodiments. FIG. 4 illustrates all of the steps and operations of FIG. 3, but unlike the process of FIG. 3, the process of FIG. 4 generates a canonical tuple only in response to a finding that there is a match as determined by block 450.

In block 460 the computer 110 generates a canonical tuple that represents a match between the first node 204 and the second node 213. In an example where the composite score for node 204 and node 213 exceed the threshold value or the computer 110 receives feedback from the end-user that node 204 and node 213 are a match, the computer 110 generates a canonical tuple containing node 204 and node 213. In another example where the composite score for node 204 and node 213 exceed the threshold value or the computer 110 receives feedback from the end-user that node 204 and node 213 are a match, the computer 110 generates a canonical tuple containing node 204 and node 213 and an identifier to identify the nodes. In yet another example where the composite score for node 204 and node 213 exceed the threshold value or the computer 110 receives feedback from the end-user that node 204 and node 213 are a match, the computer 110 generates a canonical tuple containing node 204, node 213, and the composite score associated with node 204 and node 213.

In an embodiment, only the canonical tuples 230 are stored in the results 130. In another embodiment a merged data source created by resolving nodes matched and represented by canonical tuples is stored in the results 130. Additionally, while canonical tuple 230 is only depicted in FIG. 2 as associated with nodes 202, 212, canonical tuples may be associated with more than two nodes across more than two data sources.

Figure 6:
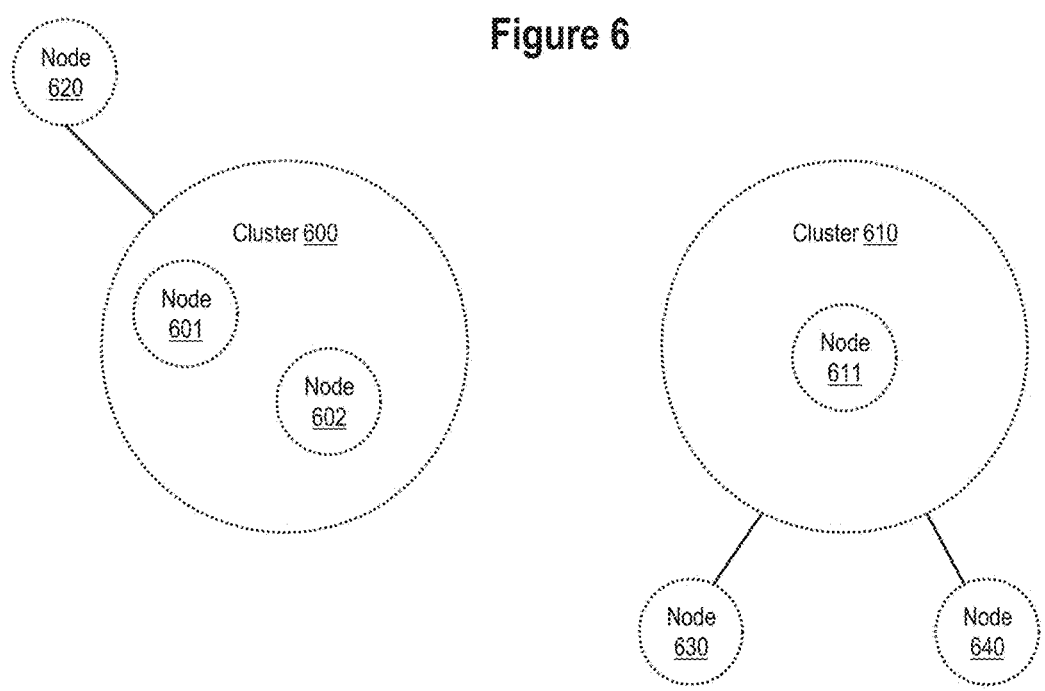
FIG. 6 illustrates two example clusters and nodes.

FIG. 6 illustrates two example clusters. In an embodiment, cluster 600 represents a match between node 601 and node 602 that was found after performing the process of FIG. 3 or FIG. 4 for two or more data sources. While node 601 and node 602 are pictured to illustrate a clear example, in other embodiments more or fewer nodes than node 601 and node 602 can be in cluster 600. In contrast, cluster 610 represents a node 611 that did not match any other nodes in any other data source.

Cluster 600 maintains a relationship to node 620, which is a node that has been identified as relating directly to each of nodes 601, 602. Cluster 610 maintains a relationship to nodes 630, 640 as nodes that have been identified as relating directly to node 611. For purposes of illustrating a clear example, only node 630 and node 640 are pictured, however, but more or fewer relationships could be maintained.

Figure 7:
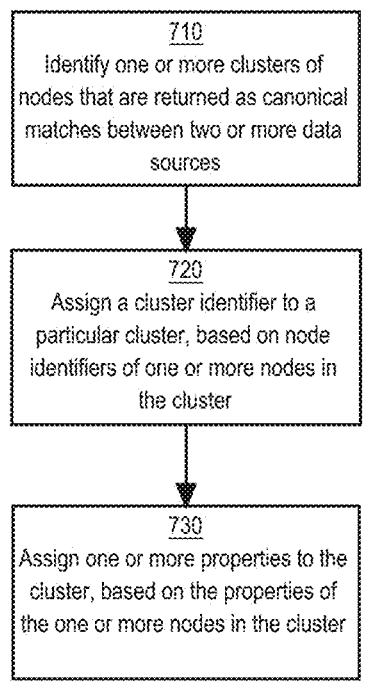
FIG. 7 illustrates an example flow or algorithm, which, in an embodiment, could be performed for resolving clusters.

FIG. 7 illustrates an example flow or algorithm for resolving clusters in one embodiment. In an embodiment, each of the processes described in connection with the functional blocks of FIG. 7 may be implemented using one or more computer programs, other software elements, and/or digital logic in any of a general-purpose computer or a special-purpose computer, while performing data retrieval, transformation, and storage operations that involve interacting with and transforming the physical state of memory of the computer. The flow of FIG. 7 is described below in conjunction with the objects and components of FIG. 1 and FIG. 6, according to an embodiment, for purposes of illustrating a clear example. The flow of FIG. 7 depicts example techniques for resolving clusters of nodes that were previously matched. The process of the flow of FIG. 7 may be repeated for each cluster to assign cluster properties to represent all of the contained nodes.

In block 710, the process identifies clusters of nodes that have been returned from other processing as canonical matches between two or more data sources. For example, with the data representation shown in FIG. 6, computer 110 may be programmed to identify clusters 600, 610 as containing nodes that have been previously matched.

In block 720, the process assigns, to a cluster, a cluster identifier that is based upon the node identifiers of the nodes that are in the cluster. In the example of FIG. 6, computer 110 may be programmed to assign clusters 600, 610 respective different cluster identifiers that are based on the identifiers of nodes 601, 602, 611, respectively. That is, a first cluster identifier for cluster 600 is based on the node identifiers of node 601, 602, and a second cluster identifier for cluster 610 is based on the node identifier of node 611. For example, if the identifiers of nodes 601, 602 are identical, then the cluster identifier for cluster 600 can be the same. However, if the identifiers of nodes 601, 602 are different, then computer 110 is programmed to assign cluster identifier that best represents nodes 601, 602. In one embodiment, assigning such a cluster identifier is performed by selecting the lexicographically highest identifier, among the node identifiers of node 601, 602, and assigning that highest identifier as the cluster identifier.

If cluster 610 only had one node 611, then computer 110 may be programmed to determine the cluster identifier based on just node 611. However, this decision is not the same as assigning cluster identifier to be exactly the same as the node identifier of node 611. For example, if cluster 610 contains a single node 611 with the node identifier of "Georgia" and there is another cluster 600 where the identifier "Georgia" will be more appropriate, then computer 110 may be programmed to assign a cluster identifier of "Georgia, USA" to cluster 610, because node 611 represents the state of Georgia within the United States, whereas nodes 601, 602 do not. In an embodiment, computer 110 is programmed to select unique cluster identifiers for each of cluster 600, 610 so that cluster identifiers of all present or later clusters do not conflict or match.

In block 730, the process assigns one or more properties to a cluster based on one or more properties of the nodes in the cluster. For example, cluster properties for cluster 600 are based on the properties of nodes 601, 602, whereas cluster properties for cluster 610 are based on the properties of node 611. In an embodiment, unlike the cluster identifier, each of the clusters 600, 610 can have one or more of the same property.

In some embodiments, the approaches of FIG. 3, FIG. 4, or other algorithms described herein may be adapted, modified, reordered, and used in different ways. For example, in one approach, the following algorithm may be used.

1. For each data source, build the full graph according to that data source. Some data sources may have internal inconsistencies, which should be corrected at this stage.

2. Calculate a collection of rule-based match scores for each entity in the graph, using both standard non-graph based scores (such as Levenshtein distance of the entity names), and graph based scores.

3. Create links between matching nodes by either: Presenting the scores to a user in a graphical interface with highest likelihood matches at the top for manual validation;

or automatically resolving matches that score above a certain threshold for a given rule.

4. Repeat steps (2) and (3) with using different scores and starting from different places in the graph until the desired level of resolution is reached. The result is a dataset of pairs of identifiers and datasource combinations, which link resolved entities together. The datasources can have different hierarchies for the same entities. For example, one such data source with a geographical component may include every single city in a country, whereas another data source may stop at the country level of detail.

Scoring methods may vary in this algorithm. In an embodiment, a collection of heuristics, each suited to a capture a different kind of duplication, is used to score and multiple passes through the data are performed using different heuristics each time. Each score is calculated for a pair of nodes. As one example, the algorithm can be programmed to determine the set of ancestors or descendants for each node and calculate their similarity. An ancestor or descendant is similar if it has already been resolved to with each other. Similarity can include a count of the number of nodes in the sets have been resolved; the edit distance, specifically how many nodes would have to be added or removed from one set or the other to obtain a match; and whether one set is a superset of the other. To determine the edit distance of a path from the top to the bottom of the tree, in one embodiment, for each node, the algorithm is programmed to construct the path from the root node of the tree to the node, and then compare the similarity of the paths using the measures specified above.

In some embodiments, similarity scores other than graph-based scores may be used. Examples include edit distance of entity identifiers, comparison against lists of abbreviations or synonyms, or features generated from other properties of the entity. Further, in some cases, a composite score may be useful whereby the collection of scores are aggregated into a single number for ease of comparison. The weighting of each component may change depending on the specific resolution case or pass on the tree.

In an embodiment, multiple passes over the dataset are performed, with each pass using a different score as the primary scoring mechanism. For example, the scores that rely on the number of resolved ancestors or descendants are useless in an initial pass (since no entities have been resolved yet), so you would only be able to use that scoring mechanism after an initial set of resolutions have been made. One sequence of passes may comprise:

1. Resolve using known abbreviations and synonyms (e.g. USA and America)
2. Resolve using edit distance on the entity identifier
3. Resolve using ancestor based scores, starting with nodes that are shallowest in the tree
4. Resolve using descendant based scores, starting with nodes that are deepest in the tree The resulting dataset establishes a canonical entity identifier for each entity, but preserves the structure of the graph according to each dataset, in addition to producing a resulting canonical graph. This allows users of the graph to make queries that have not been possible with past approaches.

4. IMPLEMENTATION EXAMPLE—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
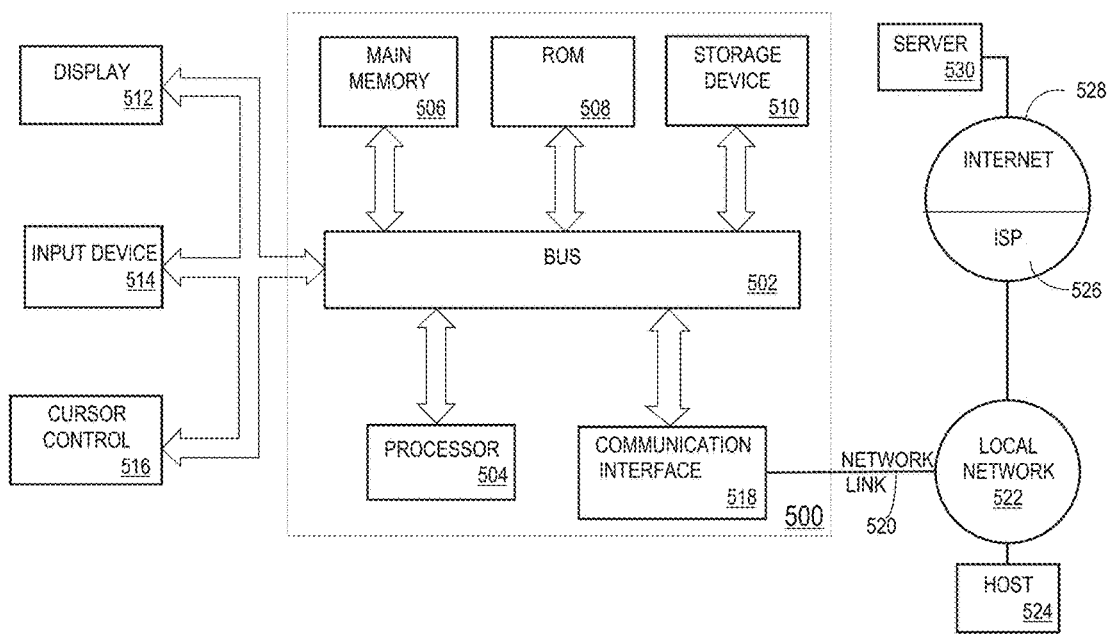
FIG. 5 illustrates a block diagram for an example computer system upon which embodiments of the present disclosure may be implemented.

Referring now to FIG. 5, it is a block diagram that illustrates a basic computing device 500 in which the example embodiments of the present Application may be embodied. Computing device 500 and its components, including their connections, relationships, and functions, is meant to be exemplary only, and not meant to limit implementations of the example embodiments. Other computing devices suitable for implementing the example embodiments may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor.

Main memory 506, such as a random access memory (RAM) or other dynamic storage device, also may be coupled to bus 502 for storing information and software instructions to be executed by processor 504. Main memory 506 also may be used for storing temporary variables or other intermediate information during execution of software instructions to be executed by processor 504.

Software instructions, when stored in storage media accessible to processor 504, render computing device 500 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and software instructions for processor 504.

One or more mass storage devices 510 may be coupled to bus 502 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (for example, the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (for example, resistive, capacitive, etc.) may be overlaid on display 512 to form a touch sensitive display for communicating touch gesture (for example, finger or stylus) input to processor 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (for example, x) and a second axis (for example, y), that allows the device to specify positions in a plane.

While in some configurations, such as the configuration depicted in FIG. 5, one or more of display 512, input device 514, and cursor control 516 are external components or peripheral devices of computing device 500, some or all of display 512, input device 514, and cursor control 516 are integrated as part of the form factor of computing device 500 in other configurations.

Functions of the disclosed systems, methods, and modules may be performed by computing device 500 in response to processor 504 executing one or more programs of software instructions contained in main memory 506. Such software instructions may be read into main memory 506 from another storage medium, such as storage device(s) 510. Execution of the software instructions contained in main memory 506 cause processor 504 to perform the functions of the example embodiments.

While functions and operations of the example embodiments may be implemented entirely with software instructions, hard-wired or programmable circuitry of computing device 500 (for example, an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more software instructions to processor 504 for execution. For example, the software instructions may initially be carried on a magnetic disk or solid-state drive of a remote computer. The remote computer can load the software instructions into its dynamic memory and send the software instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the software instructions. The software instructions received by main memory 506 may optionally be stored on storage device(s) 510 either before or after execution by processor 504.

Computing device 500 also may include one or more communication interface(s) 518 coupled to bus 502. A communication interface 518 provides a two-way data communication coupling to a wired or wireless network link 520 that is connected to a local network 522 (for example, Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (for example, ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution.

5. EXTENSIONS AND ALTERNATIVES

In the foregoing specification, the example embodiments have been described with reference to numerous specific details. However, the details may vary from implementation to implementation according to the requirements of the particular implement at hand. The example embodiments are, accordingly, to be regarded in an illustrative rather than a restrictive sense.

What is claimed is:

1. A method comprising:
calculating a first relational classification score for a first node in a first graph that is digitally stored in computer memory, the first graph representing a first digitally stored database, the first node representing an element of the first digital stored database, and the first relational classification score being a measure of a logical position of the first node in the first graph;
calculating a second relational classification score for a second node in a second graph that is digitally stored in computer memory, the second graph representing a second digitally stored database, the second node representing an element of said second digitally stored database, and the second relational classification score being a measure of a logical position of said second node in the first graph;
calculating a relational classification matching score for the first node and the second node that is based upon on the first relational classification score and the second relational classification score, the relational classification matching score representing a similarity in location in the graphs of said first node and said second node;
calculating a composite score based at least upon the relational classification matching score, the composite score being a measure of quality of match of said first node and said second node;
generating a canonical tuple that represents a match between the first node and the second node in response to determining that the composite score is equal to or greater than a specified threshold score value;
storing said canonical tuple as a merged digitally stored database that is created to resolve said first node and said second node;
wherein the method is performed by one or more computing devices.

2. The method of claim 1, further comprising:
calculating the first relational classification score based in part on one or more of: ancestors or descendants of the first node; edit distance of the path from a root node of the first graph to the first node;
calculating the second relational classification score based in part on one or more of: ancestors or descendants of the second node; edit distance of the path from a root node of the second graph to the second node.

3. The method of claim 1, further comprising calculating the composite score based on one or more of: an entity identifier edit distance score; a property score; a known synonym score; a known abbreviation score.

4. The method of claim 1, further comprising calculating each relational classification score as a measure of a logical position of the first node, and based upon relationships to other nodes by calculating a distance of the first node to a root node of the first graph, counting proximate nodes to which the first node is joined as parent nodes, grandparent nodes, child nodes, or grandchild nodes, and determining which proximate nodes match the first node in node identifiers, properties or attributes.

5. The method of claim 1, wherein the first graph has been generated based upon database records of a first database that contains the first node, and wherein the second graph has been generated based upon other database records of a second, different database that contains the second node.

6. The method of claim 1, further comprising calculating the relational classification matching score for the first node and the second node as a representation of similarity between the first node and the second node based upon a first similarity of the respective locations of the nodes, a second similarity of all proximate nodes that are joined respectively to the first node and the second node, and a third similarity of numbers of child nodes of the first node and the second node.

7. The method of claim 1, further comprising calculating the composite score as a measure of quality of match of the first node and the second node, using the relational classification matching score and also using one or more of: a node identifier edit distance matching score, property matching score, known synonym matching score, or known abbreviation matching score.

8. The method of claim 1, further comprising:
creating and storing, in computer memory, an output graph comprising the first graph, the second graph, and the canonical tuple, wherein the canonical tuple comprises a first edge and a second edge that respectively link the canonical tuple to the first node and the second node when the composite score exceeds a threshold value;
causing displaying the output graph using a computer display device in a graphical user interface that visually depicts one or more nodes, edges, and canonical tuples of the output graph.

9. The method of claim 8, further comprising partitioning the output graph into two or more clusters of nodes, in which all nodes of a particular cluster among the two or more clusters are directly or transitively connected by edges of the output graph.

10. A data processing system, comprising:
one or more processors;
one or more non-transitory machine readable storage media storing sequences of instructions which, when executed using the one or more processors, cause the one or more processors to perform:
calculating a first relational classification score for a first node in a first graph, wherein said first graph represents a first digital stored database, said first node represents an element of said first digital stored database, and said first relational classification score is a measure of a logical position of said first node in the first graph;
calculating a second relational classification score for a second node in a second graph, wherein said second graph represents a second digitally stored database and said second node represents an element of said second digital stored database, and said second relational classification score is a measure of a logical position of said second node in the first graph;
calculating a relational classification matching score for the first node and the second node that is based upon on the first relational classification score and the second relational classification score, wherein said relational classification matching score represents a similarity in location of said first node and said second node;
calculating a composite score based at least upon the relational classification matching score, wherein said composite score is a measure of quality of match of said first node and said second node;

generating a canonical tuple that represents a match between the first node and the second node in response to determining that the composite score is equal to or greater than a specified threshold score value;

storing said canonical tuple as a merged digital stored database that is created to resolve said first node and said second node;

wherein the method is performed by one or more computing devices.

11. The computer system of claim 10, further comprising sequences of instructions which when executed by the one or more processors cause the one or more processors to perform:

calculating the first relational classification score based in part on one or more of: ancestors or descendants of the first node; edit distance of the path from a root node of the first graph to the first node;

calculating the second relational classification score based in part on one or more of: ancestors or descendants of the second node; edit distance of the path from a root node of the second graph to the second node.

12. The computer system of claim 10, further comprising sequences of instructions which when executed by the one or more processors cause the one or more processors to perform calculating the composite score based on one or more of: an entity identifier edit distance score; a property score; a known synonym score; a known abbreviation score.

13. The computer system of claim 10, further comprising sequences of instructions which when executed by the one or more processors cause the one or more processors to perform calculating each relational classification score as a measure of a logical position of the first node, and based upon relationships to other nodes by calculating a distance of the first node to a root node of the first graph, counting proximate nodes to which the first node is joined as parent nodes, grandparent nodes, child nodes, or grandchild nodes, and determining which proximate nodes match the first node in node identifiers, properties or attributes.

14. The computer system of claim 10, wherein the first graph has been generated based upon database records of a first database that contains the first node, and wherein the second graph has been generated based upon other database records of a second, different database that contains the second node.

15. The computer system of claim 10, further comprising sequences of instructions which when executed by the one or more processors cause the one or more processors to perform calculating the relational classification matching score for the first node and the second node as a representation of similarity between the first node and the second node based upon a first similarity of the respective locations of the nodes, a second similarity of all proximate nodes that are joined respectively to the first node and the second node, and a third similarity of numbers of child nodes of the first node and the second node.

16. The computer system of claim 10, further comprising sequences of instructions which when executed by the one or more processors cause the one or more processors to perform calculating the composite score as a measure of quality of match of the first node and the second node, using the relational classification matching score and also using one or more of: a node identifier edit distance matching score, property matching score, known synonym matching score, or known abbreviation matching score.

17. The computer system of claim 10, further comprising sequences of instructions which when executed by the one or more processors cause the one or more processors to perform:

creating and storing, in computer memory, an output graph comprising the first graph, the second graph, and the canonical tuple, wherein the canonical tuple comprises a first edge and a second edge that respectively link the canonical tuple to the first node and the second node when the composite score exceeds a threshold value;

causing displaying the output graph using a computer display device in a graphical user interface that visually depicts one or more nodes, edges, and canonical tuples of the output graph.

18. The computer system of claim 17, further comprising sequences of instructions which when executed by the one or more processors cause the one or more processors to perform partitioning the output graph into two or more clusters of nodes, in which all nodes of a particular cluster among the two or more clusters are directly or transitively connected by edges of the output graph.

19. A computer-implemented data processing method for determining whether a first node, which is associated with a first entity of a first digitally stored database, matches and represents a same object as a second node, which is associated with a second entity of a second, different digitally stored database, the method comprising:

calculating a first relational classification score for the first node in a first graph that has been created and stored in a computer memory based upon the first entity of the first digitally stored database and calculating a second relational classification score for the second node in a second graph that has been created and stored in the computer memory based upon the second entity of the second digitally stored database, including calculating each relational classification score as a measure of a logical position of the first node, and based upon relationships to other nodes by calculating a distance of the first node to a root node of the first graph, counting proximate nodes to which the first node is joined as parent nodes, grandparent nodes, child nodes, or grandchild nodes, and determining which proximate nodes match the first node in node identifiers, properties or attributes;

calculating a relational classification matching score for the first node and the second node that is based upon on the first relational classification score and the second relational classification score, as a representation of similarity between the first node and the second node based upon a first similarity of the respective locations of the nodes, a second similarity of all proximate nodes that are joined respectively to the first node and the second node, and a third similarity of numbers of child nodes of the first node and the second node;

calculating a composite score as a measure of quality of match of the first node and the second node, using the relational classification matching score and also using one or more of: a node identifier edit distance matching score, property matching score, known synonym matching score, or known abbreviation matching score;

generating a canonical tuple that represents a match between the first node and the second node in response to determining that the composite score is equal to or greater than a specified threshold score value.

20. The method of claim 19, further comprising:

creating and storing, in computer memory, an output graph comprising the first graph, the second graph, and the canonical tuple, wherein the canonical tuple comprises a first edge and a second edge that respectively link the canonical tuple to the first node and the second node when the composite score exceeds a threshold value;

partitioning the output graph into two or more clusters of nodes, in which all nodes of a particular cluster among the two or more clusters are directly or transitively connected by edges of the output graph;

causing displaying the output graph using a computer display device in a graphical user interface that visually depicts one or more nodes, edges, and canonical tuples of the output graph.

* * * * *